COLOR PICTURE TRANSMISSION AND REPRODUCTION

Filed April 23, 1948 2 SHEETS—SHEET 1

INVENTOR.
Harold Carlson
BY E. R. Evans
attorney

May 27, 1952 H. CARLSON 2,598,504

COLOR PICTURE TRANSMISSION AND REPRODUCTION

Filed April 23, 1948 2 SHEETS—SHEET 2

INVENTOR.
Harold Carlson
BY E. R. Evans
attorney

Patented May 27, 1952 2,598,504

UNITED STATES PATENT OFFICE 2,598,504

COLOR PICTURE TRANSMISSION AND REPRODUCTION

Harold Carlson, Hartsdale, N. Y., assignor to Times Facsimile Corporation, New York, N. Y., a corporation of New York Application April 23, 1948, Serial No. 22,740

8 Claims. (Cl. 178—5.2)

This invention relates to a method and system for transmission and reproduction of colored pictures, and more particularly to an electrical transmission system adapted to use ordinary communication channels, such as a voice or telephoto channel.

Heretofore in facsimile and newsphoto work, transmission of colored pictures has been attempted by preparing three color separation positives or negatives and transmitting them separately. Also the reproduction of color photographs by the photographic process usually involved the use of three or more separation negatives representing the primary colors, as well as black in some instances.

The transmission of three or more pictures for such color processes involves at least triple transmitting time over ordinary black and white transmission. Furthermore, each transmission occurs at different time periods if only one circuit is employed, and during these periods the circuit characteristics are not always the same, resulting in distortion as to tone or density and color reproduction. Dimensional variations of the three or more transmitted component pictures usually causes physical distortion and lack of registration between the respective picture components as received. Accordingly highly skilled personnel is required in the preparation of the copy to be transmitted, for controlling the apparatus to reproduce the color separation negatives and to make the final reproduction print. For these reasons the difficulties involved in the prior method have been sufficient to prevent its use in telephoto work to any appreciable extent. The results with ordinary circuit variations and operating difficulties have been so poor that they were not considered commercially acceptable.

The object of the present invention in general terms is to overcome, at least to a large extent, the difficulties encountered in prior transmission processes and reduce the effect of the variables to be controlled for obtaining satisfactory color reproduction.

Another object of the invention is to provide an improved method of and system for color picture transmission that is capable of transmitting the full color spectrum in a single transmission and employing a single carrier current. The elimination of the requirement for transmitting three color separation originals makes possible the use of an original color transparency as the transmitter copy, such as Eastman "Ektachrome." The invention is not restricted to this type of copy however.

A further object of the invention is to provide an improved color transmission method and apparatus in which physical distortion is reduced, since variation in circuit or equipment characteristics during successive time periods is not involved.

Another object of the invention is to provide an improved color-picture transmission arrangement for modulating a single carrier current simultaneously as to amplitude and frequency.

Still another object of the invention is to provide an improved means for reproducing an original print or photograph in color, said means being adapted to be controlled electrically, as for example, by a current which is varied in amplitude and frequency or phase in accordance with the desired characteristics of the reproduction or print.

Other objects and advantages of the invention will appear from the following detail description of the preferred embodiment thereof shown in the accompanying drawings, in which Fig. 1 is a view, partly schematic, of a transmitter embodying the invention;

For the sake of simplicity, the following specification will be largely confined to the employment of the invention in the transmission of colored pictures for facsimile or newsphoto work although certain features thereof are useful in other applications, such as the reproduction of color prints similar to those now made by photographic methods and also color-press printing.

In accordance with the preferred embodiment of the invention to be described, the transmitter comprises generally conventional facsimile scanning apparatus but arranged to provide two scanning beams. The beams impinge upon separate photoelectric or light-sensitive units, one of which has a current output which varies jointly with the color being scanned in the original picture and the density or tone of the color, and the other a current output which varies only as a function of the density or tone of the elemental area being scanned. Preferably the output currents of the two photoelectric units, after being amplified, are combined and impressed upon modulators arranged to modulate a carrier current as to amplitude and frequency, one modulation representing the instantaneous color of the picture being scanned, and the other representing instantaneous density or tone independent of color. The modulated carrier wave is transmitted over any suitable channel to the receiving station where the picture is reproduced in natural colors by exposing a photosensitive layer or layers to control the density and color of the recording process simultaneously in accordance with the amplitude and frequency variations of the carrier. If desired, the carrier wave may be modulated as to phase instead of frequency or by any well-known modulation process which is suitable for transmitting two conditions or variations simultaneously by a single carrier. The signal variations may be employed at the recorder for reproducing a facsimile of the colored original by either a photographic process or by color-press printing processes which are electrically controlled. Also while transmission from a color positive scanned by reflected light is described in the following specification, it is obvious that a color negative or a positive color transparency may be employed by using suitable scanning equipment.

Figure 1:
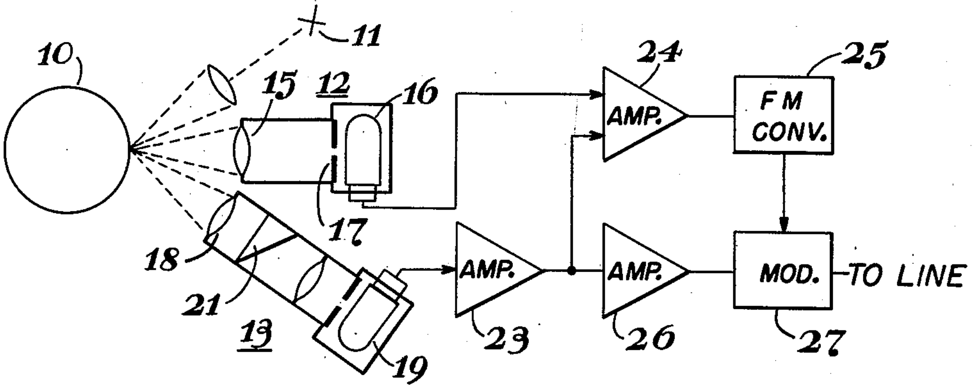

In Fig. 1 the color picture 10 is shown as mounted on a rotatable drum in accordance with well-known facsimile practice suitable for scanning by elemental area, for example as shown in my prior patent, No. 2,149,277 granted March 7, 1939. A light source 11 is arranged to floodlight a small area or an elemental area of the colored original 10. Two scanning optical systems 12 and 13 are shown, the optical system 12 being conventional in that it comprises only the usual objective lens 15, photocell 16 and in the case of floodlighting of the picture an aperture plate 17. The lens 15 may be color-corrected and the spectral characteristics of the light source 11 and the color response of the photocell 16 should be so related, as will be explained with reference to Fig. 4, that the output of the cell varies directly or as a function of both the color of the elemental area being scanned and the density or tone of said elemental area. Preferably the light source should be operated at a color temperature giving approximately equal light flux for all wavelengths in the visible spectrum (from about 4200 Ang. to 6800 Ang.); and the lens and photocell selected to give linear color response. A typical commercial cell having the desired characteristics is the RCA IP22 electron multiplier type.

In the optical system 13, the conventional lenses, photocell and aperture are used, but in addition a transparent or translucent spectrum and density wedge 21 is arranged in the beam reflected from the color picture. The density wedge is so arranged that the range of the visible color spectrum to which photocell is most sensitive is associated with the portion of the wedge having the greatest density and the taper of the wedge is such that the response of the cell is independent of wavelength or color and is only a function of the tone or intensity of the light reflected from the picture. Thus, for constant intensity and variable wavelength of light, the output of the cell 19 is constant.

Figures 2, 3, 4:
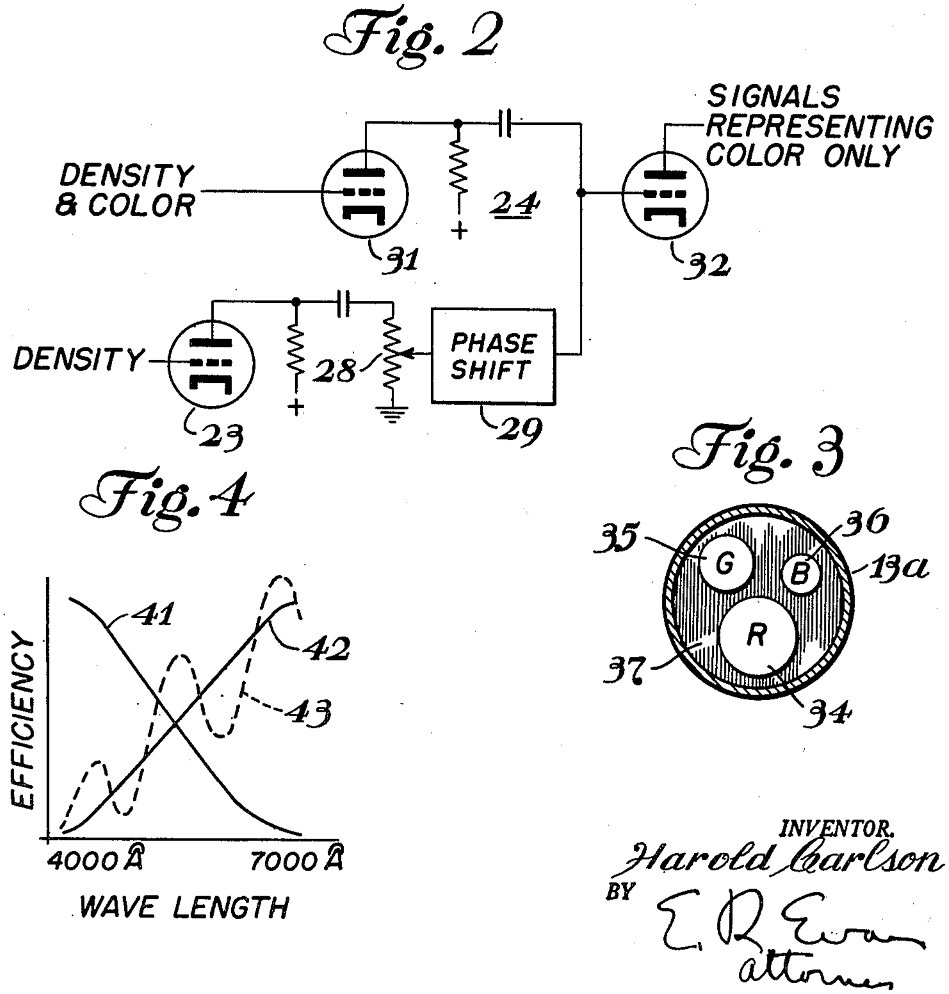
Fig. 2 is a diagrammatic view of the interconnection between two amplifiers shown in Fig. 1.
Fig. 3 is a view showing a modified filter system which may be used in the arrangement of Fig. 1.
Fig. 4 is a graph showing preferred spectral characteristics of elements of the transmitting system.

The light-transmitting characteristics of the optical system 13 and the response of the photocell 19 are adjusted so that the cell output is equal to that portion of the output of the optical system 12 which results from variations in density or tone alone. An amplifier 23 may be employed to obtain the desired output from the cell 19. The output currents from the two optical systems, suitably adjusted in amplitude and phase as will be explained in connection with Fig. 2, are impressed upon an amplifier 24 so that the output of this amplifier is a signal current representing only color variations of the picture 10. This signal current is impressed upon a modulator or frequency-modulation converter 25, and employed to modulate the frequency or phase of the signal carrier wave. The FM converter may for example be similar to that described by Mathes in "RCA Review" for October, 1939, pages 136–138. Similarly, the output signal current from amplifier 23 is impressed upon the amplifier 26 and the amplified signal variations representing density alone utilized in a modulator 27 to modulate the amplitude of the same signal carrier wave. In this manner the carrier is simultaneously modulated in accordance with both the instantaneous variations in color and in density or tone of the color picture 10.

Fig. 2 illustrates the manner in which the signal output from the amplifier 23 representing density variations may be utilized to cancel out the part of the signal in amplifier 24 resulting from the changes in density in the scanning beam applied to the optical system 12. A gain control, such as potentiometer 28, and a phase-shifting unit or delay network 29 are connected in the output circuit of the amplifier 23; or the phase shift may be made by adjustably phasing the scanning areas of the optical systems 12 and 13. The amplifier 24 comprises two electron discharge tubes 31 and 32, shown as triodes by way of example.

As indicated and as stated above with reference to Fig. 1, the input signal currents to the amplifiers 23 and 24 represent density, and density plus color respectively. Consequently, when the amplitude and phase of the signal output from amplifier 23 has been adjusted by the elements 28 and 29 until it is equal and opposite in phase to the density component of the signal output of amplifier 31, the input to amplifier 32 and the output current from the said amplifier 32 represents the instantaneous color being scanned on the color picture 10. Therefore modulating the frequency of the carrier wave in accordance with this signal as explained above enables the transmission to the receiving station of a modulated signal current representing color of the picture being scanned. It will be apparent that the amplitude modulation of the carrier by modulator stage 27 enables the transmission of the density or tone variation of the picture. Since the frequency of the carrier need not be changed over a very wide range for satisfactory transmission, the transmission channel may be a carrier telephone circuit of the modern type such as a type K carrier channel, instead of a special wide-band channel. As usual in facsimile and telephoto systems, the intermediate circuits and amplifiers used for transmission should have a flat frequency characteristic and negligible delay distortion for optimum results.

A plurality of color filters may be employed in the optical system 13 instead of the density wedge 21 and associated spectrum. This modification is shown in Fig. 3 wherein the red, green and blue filters are represented at 34, 35 and 36 respectively. These filters may be mounted in an opaque diaphragm 37 mounted across the barrel 13a of the optical system. The "red" filter is defined as a filter which passes red. Similarly, the "green" and "blue" filters pass the green and blue portions of the spectrum. The filters are shown as of different sizes, the red filter being approximately twice the area of the green, and the green twice the area of the blue, depending upon the characteristics of the filters and lenses. The variations in area of the filters are correlated with the sensitivity of the photocell; for the example shown it is assumed that the photocell 19 is a blue-sensitive cell. Thus, by selecting the proper filter areas, substantially equal signal output from the cell can be obtained throughout the entire spectrum.

In the graph shown in Fig. 4, the curve 41 represents the variation in sensitivity of a typical commercial photocell such as the RCA type IP22. The variation in the sensitivity of the cell is substantially linear over the entire visible portion of the spectrum. The curve 42 in Fig. 4 represents the characteristics of the optical system 13 (and including the light source 11), and the color-corrected transmission characteristics or optical efficiency of the lenses and wedge 21. Since this curve is substantially the inverse of the curve 41 in the visible range, the sensitivity of the photocell is corrected to provide substantially equal current output over the entire spectrum. Consequently the output of the cell varies only with the intensity of the light or tone density, and is independent of color. The broken-line curve 43 of Fig. 4 similarly represents the characteristics of the optical system 13 when the filters 34, 35 and 36 are substituted for the wedge 21 and associated spectrum. It will be seen that the curve 43 at several points approximates the curve 42 and thus the desired color correction of the photocell may be obtained. Any suitable color correction means of this character may be employed, and if desired, the characteristics of the recording film or color-printing process may be taken into account; i. e. the color and density characteristics of one or both of the transmitting optical systems may be non-linear to take care of non-linearity in the characteristics of the photosensitive film or other reproduction material. Since various photosensitive materials are available for the reproduction of color pictures and additional materials of other types will become available in the future, it is obviously impossible to specify exactly the optimum characteristics of the optical systems and photocell, but these can be readily determined for any particular reproduction process by selection and adjustment of the optical components.

At the receiving station the scanning apparatus, except as herein described, may be generally similar to that described in my prior patent, No. 2,182,115 granted December 5, 1939. The received signal carrier is impressed upon an amplifier 45 having a flat frequency characteristic which is operative to raise the signal level to a suitable value. The output of the amplifier 45 is impressed upon a light valve 46, a rectifier or detector 47 being interposed between the amplifier and the light valve if desired. The light valve 46 is arranged to control the beam of light from a source 48 whereby the beam is modulated in accordance with the variations in amplitude of the signal carrier in the usual manner. Any other equivalent method of modulating a light source may be substituted for the light valve as, for example, the use of a controllable light source such as a gas-discharge lamp.

A portion of the output from the amplifier 45 is fed through a limiter 51 and discriminator 52 to produce a signal current which varies in amplitude in accordance with the frequency variations of the signal carrier. Such a demodulator is described in the above mentioned article in "RCA Review," pages 138–142. The limiter 51 removes the initial amplitude variations of the carrier, leaving an output varying only in frequency, the frequency variations representing the instantaneous color values of the original color picture. The discriminator 52, which may be a filter or ratio detector, converts frequency variations of the carrier into amplitude variations also representative of the instantaneous color values of the original picture. These variations, after being amplified in the amplifier 53 and rectified in the rectifier 54, are impressed upon a magnet 55 disposed in operative relation to a movable armature 56. The armature 56 is attached to a prism 57 so as to control the spectrum projected from the light source 48 upon an aperture plate 58 in front of the recording film or photosensitive layer 59. The prism 57 separates the colors in the light beam from the source 48 and as the prism is tilted by the magnet coil 55, the spectrum sweeps across the aperture in the plate 58 so that the light beam, which is varied in intensity by the light valve 46, is varied in color by the prism 57 insofar as the part striking the photo-sensitive material 59 is concerned. This material may be color film such as Eastman Ektachrome or Agfa color film. After exposure, the film is developed and utilized in accordance with conventional photographic or graphic arts processing.

Figure 5:
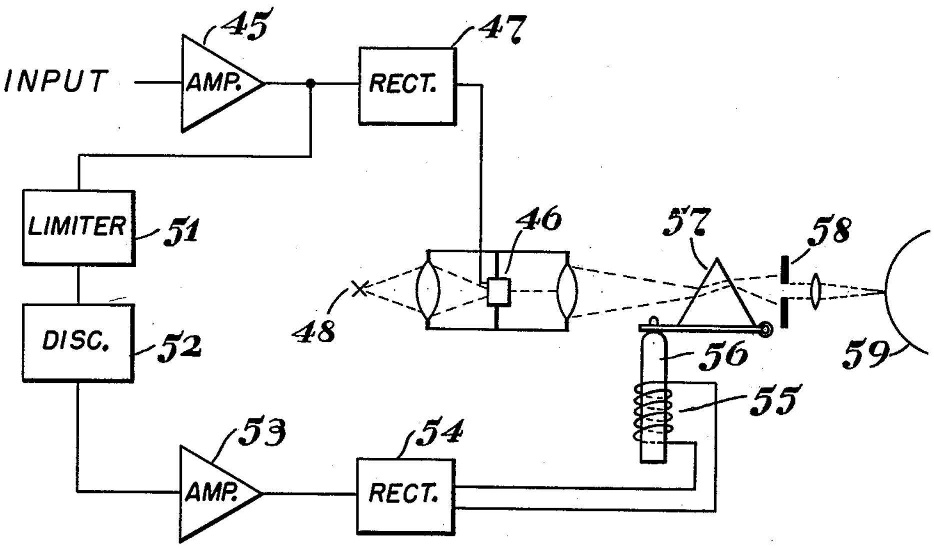
Fig. 5 is a view, partly schematic, of receiving or reproducing apparatus embodying the invention.
Figure 6:
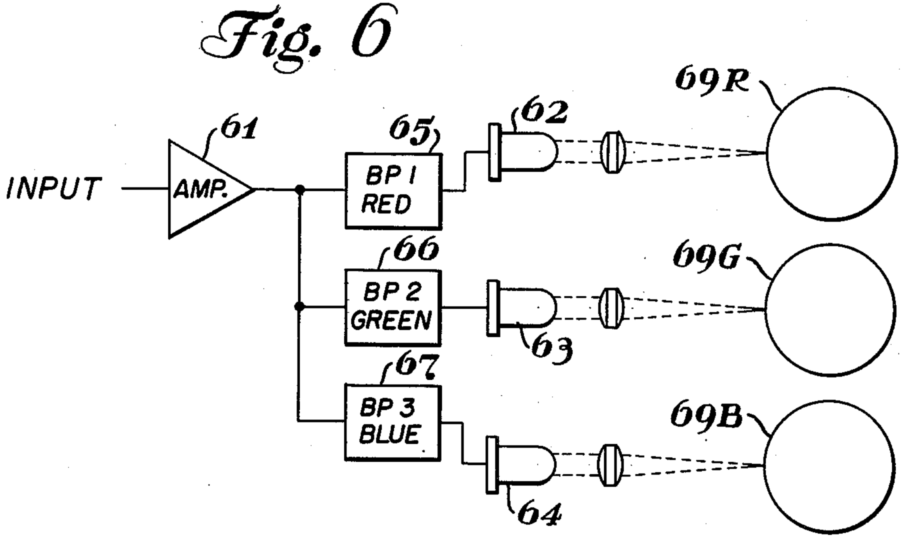
Fig. 6 is a similar view of a modification.

Instead of employing a prism galvanometer as shown in Fig. 5, any other suitable means may be provided for controlling the color of the light impinging upon the recording material in accordance with the modulated carrier wave. Where the carrier varies in frequency to represent the color changes, as described, a plurality of filters may be used to separate the color components of the signal as shown in Fig. 6. In this modification the incoming signal is amplified by an amplifier 61 to raise the signal level to a suitable value. The signal is impressed upon a plurality of signal-recorder lamps 62, 63 and 64 through associated filters 65, 66 and 67. Filter 65 may pass frequencies representing red, the filter 66 green and the filter 67 blue. The lamps may be gas-discharged lamps, such as the Sylvania type R1130 which generates a light output of an intensity that is a function of the impressed voltage and which may be modulated at a rather high frequency. Conventional optical systems including lenses 68 may be employed for focusing the beams from the respective lamps upon the recording films 69R, 69G and 69B, to expose color separation negatives in the usual reproduction method; or the three light beams may be focused upon a color film as described in connection with Fig. 5. The recording medium is moved in synchronism with the color picture being scanned at the transmitting station, as by supporting the same upon a synchronous rotatable drum as shown in the above-mentioned patents.

It will be apparent that the invention contemplates a system and method that permits the facsimile transmission of colored originals in a single transmitting cycle, without employing the skilled personnel heretofore required. The difficulties resulting from transmission variables, from the necessity for registration of color separation negatives and other processing steps are eliminated. The invention also has the advantage that the transmitter copy may be an original color transparency and reproduction can be made directly on the same type of photo-sensitive medium to produce the full color transparencies which are desirable for supplying to the customer in newsphoto services. These advantages over the prior systems and methods of reproducing colored pictures are of great importance from a practical standpoint, particularly in facsimile and newsphoto work.

While several modifications of the invention have been described in detail for the purpose of explaining the underlying principles thereof, other modifications will occur to those skilled in the art and may be made without departing from the scope of the invention.

I claim:

1. In a picture transmitting system for the reproduction of colored images or pictures, in combination, means for scanning a colored area or original picture, means controlled thereby for generating a signal current simultaneously modulated in frequency and amplitude separately in accordance with both the color and density variations in said area or original picture and means responsive to said current for reproducing a facsimile of said area or original picture in color.

2. In a picture transmitting system for the reproduction of colored images or pictures, in combination, means for scanning a colored area or original picture, means controlled thereby for varying the amplitude and frequency of a carrier wave, one of said variations being a function of instantaneous color variations only and the other a function of instantaneous density variations irrespective of color in said area or original picture and means responsive to said carrier wave for reproducing a facsimile of said area or original picture in color.

3. In a system for the reproduction of colored pictures, in combination, scanning means for generating a signal representing the combined color and density variations in elemental areas of a colored area or original picture, a second scanning means for generating a signal representing density variations only in elemental areas of said colored area or original picture, means connected to said first-mentioned scanning means for deriving a signal varying only in accordance with the color of elemental areas of said colored area or original picture, means for generating a signal modulated in both amplitude and frequency in accordance with said color and density variations, respectively, and reproducing means controlled by said signal.

4. A system according to claim 3 in which said second scanning means comprises a color-compensating element and a photocell, said element being of such character that the response of the photocell is independent of the color being scanned in said colored original.

5. In a system for the reproduction of colored pictures, in combination, means for scanning a colored area or original picture, means connected thereto for generating a signal varying in frequency with changes in the color of elemental areas of said area or original picture and varying in amplitude with changes in the density of elemental areas of said area or original picture, a photosensitive layer and means for exposing said layer to reproduce a colored facsimile of said area or original picture, said last-mentioned means comprising means for varying the intensity of a light beam directed on said photosensitive layer in accordance with amplitude variations of said signal and means including a prism for varying the color of said beam in accordance with frequency variations of said signal.

6. In a color-picture transmission and/or reproduction system, in combination, a first scanning means for generating a signal varying in amplitude in accordance with the combined tone and color variations of the scanned original image or picture, with changes in either tone or color effecting amplitude variations in said signal, a second scanning means for generating a signal independent of the color and varying in amplitude as a function only of the tone variations of the original image or picture, said second scanning means embodying an optical system and photocell, said optical system containing a spectrum and density wedge correlated with the response characteristics of the photocell to eliminate or minimize the effect of color variations with respect to the photocell output current, a photo-sensitive layer, means including a light source for exposing said layer to reproduce at least one color component of the original image or picture and means including said first and second scanning means for controlling said exposing means.

7. A system according to claim 6 in which the output signals of both said scanning means are combined in opposite phase to produce a third output signal varying in amplitude in accordance with the color only of the scanned original image or picture.

8. In a system for reproduction of colored pictures, in combination, means for scanning a colored original and generating two signals, one corresponding to instantaneous color variations of elemental areas of said original irrespective of tone shading and the other corresponding to instantaneous variations in tone shading of the elemental areas irrespective of color variations, means for generating a carrier current, means for amplitude-modulating said carrier current in accordance with variations in the signal representing tone shading in said original irrespective of color variations, means for frequency-modulating said carrier current in accordance with the signal representing color variations in said original irrespective of variations in tone shading, and means controlled by said modulated carrier current for reproducing a colored picture corresponding to the colored original.

HAROLD CARLSON.

REFERENCES CITED

The following references are of record in the file of this patent:

UNITED STATES PATENTS

| Number | Name | Date |
|---|---|---|
| 2,075,071 | Usselman | Mar. 30, 1937 |
| 2,333,969 | Alexanderson | Nov. 9, 1943 |
| 2,375,966 | Valeusi | May 15, 1945 |
| 2,378,746 | Beers | June 19, 1945 |
| 2,415,051 | Thompson | Jan. 28, 1947 |
| 2,420,029 | Brady | May 6, 1947 |
| 2,422,778 | Finch | June 24, 1947 |
| 2,461,515 | Bronwell | Feb. 15, 1949 |
| 2,492,926 | Valensi | Dec. 27, 1949 |